July 10, 1945. W. B. BRONANDER 2,379,879
METHOD OF FORMING AND APPLYING COOLING FINS TO TUBULAR MEMBERS
Filed Nov. 5, 1942 2 Sheets-Sheet 1
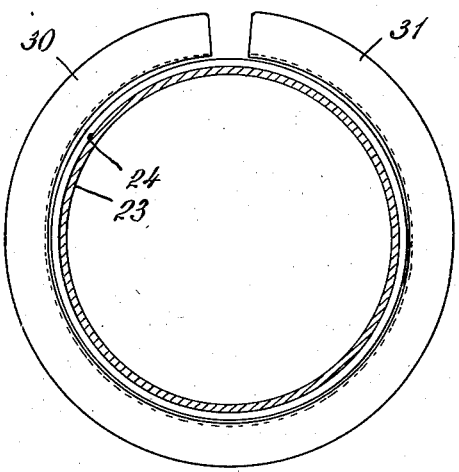
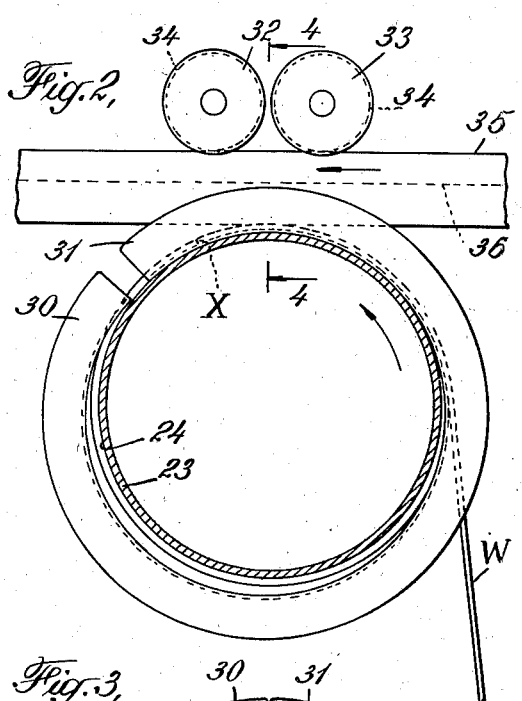
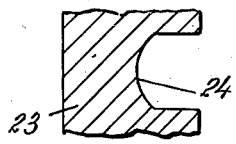
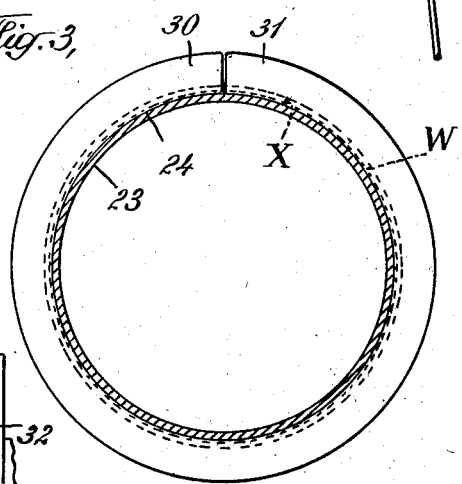
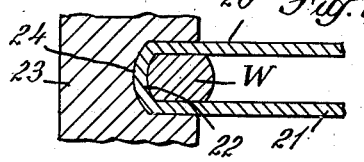
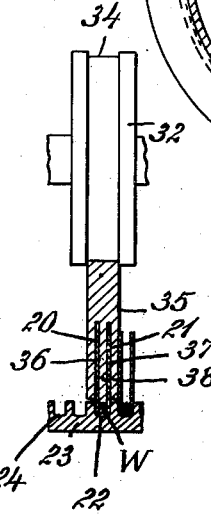
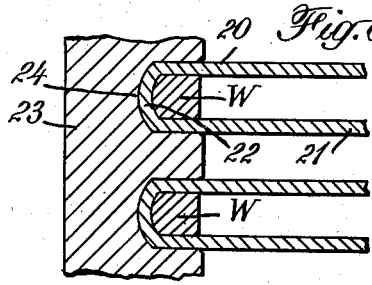
INVENTOR.
Wilhelm B. Bronander
BY
Luther W Hawley
ATTORNEY July 10, 1945.  W. B. BRONANDER  2,379,879
METHOD OF FORMING AND APPLYING COOLING FINS TO TUBULAR MEMBERS
Filed Nov. 5, 1942  2 Sheets-Sheet 2
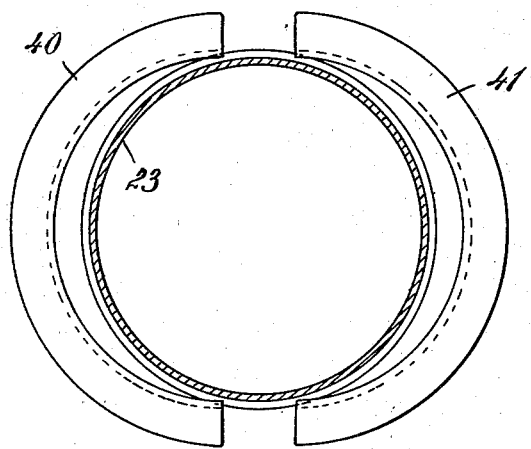
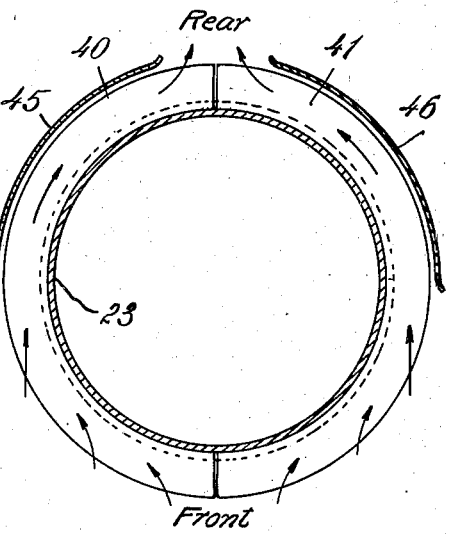
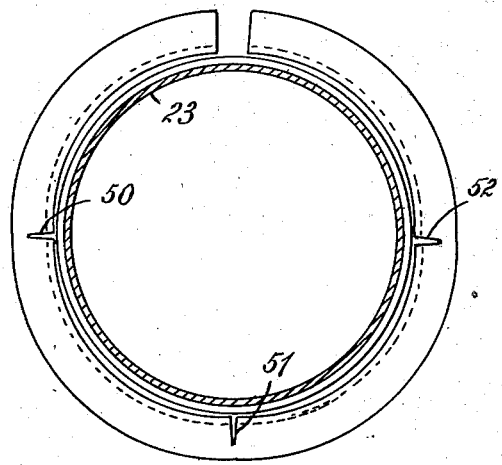
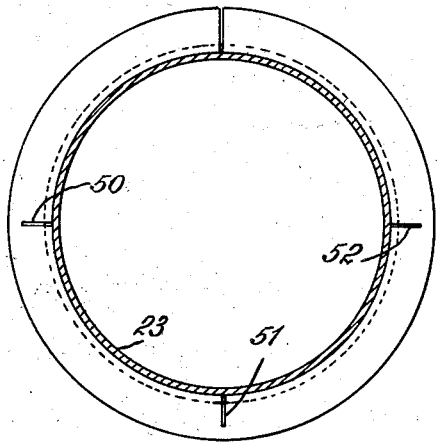
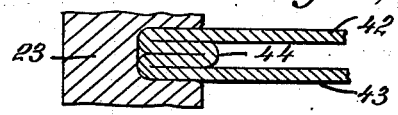
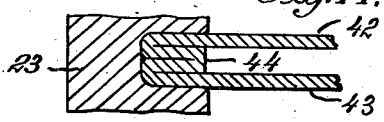
INVENTOR.
Wilhelm B. Bronander
BY
ATTORNEY Patented July 10, 1945

2,379,879

UNITED STATES PATENT OFFICE 2,379,879

METHOD OF FORMING AND APPLYING COOLING FINS TO TUBULAR MEMBERS

Wilhelm B. Bronander, Montclair, N. J.

Application November 5, 1942, Serial No. 464,627

4 Claims. (Cl. 29—157.3)

This invention relates to cooling fins and particularly to a method of forming and applying a cooling fin or heat exchange element to a member or casing to be cooled.

It is the usual practice to form cooling fins integral with the part to be cooled or to braze or solder fins thereto. The casting of integral fins involves the use of expensive patterns and fins so cast are brittle and easily broken. Furthermore, the casting process limits materially the number of fins per unit of length since they must be spaced apart materially in order to be cast. Brazing, welding or soldering fins to the part to be cooled is expensive and time consuming and does not, as a rule, result in a rigid and efficient heat conducting joint.

This invention has for its salient object to provide a simple, practical and efficient method of forming and applying a cooling fin to the part to be cooled, such as a tube, cylinder, casing or other part, in such a manner that the method can be expeditiously carried out and will produce a firm and rigid connection capable of high conductivity without requiring brazing, soldering or welding.

Further objects of the invention will appear from the following specification taken in connection with the drawings which form a part of this application, and in which Fig. 1 is an elevational view, partly in section, of a cooling fin applied around a tube or cylinder part to be cooled, prior to the securing of the fin thereto;

Fig. 2 is a view similar to Fig. 1 but illustrating the method of securing the fin to the part to be cooled;

Fig. 3 is a view similar to Fig. 1 but shows the fin secured in position;

Fig. 4 is an elevational view, partly in section, taken substantially on line 4—4 of Fig. 2;

Fig. 5 is a sectional elevation of a portion of the part to be cooled, showing the groove therein within which the fin is to be secured;

Fig. 6 is a view similar to Fig. 5 but showing a double walled fin inserted in the groove;

Fig. 7 is a view similar to Fig. 6 but showing a metal or wire inserted between the walls of the fin;

Fig. 8 is a view similar to Fig. 7 but shows two grooves having double walled fins secured in position therein;

Fig. 9 is a view similar to Fig. 1 but illustrating another embodiment of the invention in which the fin is applied in two parts to the groove of the tube, cylinder or other part to be cooled;

Fig. 10 is a view similar to Fig. 9 but showing the two fin sections secured around the member to be cooled and also showing baffles for directing the circulation of the air around the part to be cooled and between the fin walls;

Fig. 11 is a view similar to Fig. 1 but showing a slight modification in the construction of the fin to facilitate the application of the fin to the member to be cooled;

Fig. 12 is a view similar to Fig. 11 but showing the fin of Fig. 11 secured in position;

Fig. 13 is a sectional elevation showing a fin, W in section, positioned in a groove in the member to be cooled; and Fig. 14 is a view similar to Fig. 13 showing the material between the walls of the fin compressed to secure the fin in firm gripping engagement in the groove.

The invention briefly described consists of a method of forming and applying cooling fins involving forming a groove in the part to be cooled, forming a double wall fin preferably having substantially parallel walls, cutting the fin strip into predetermined lengths which are bent to a shape conforming to the contour of the base of the groove, as for instance, to arcuate shape when the fin is to be applied to a cylindrical groove, and forcing the fin lengths into the grooves and securing the fins therein by pressure directed toward the base of the groove upon material disposed between the walls of the fin, thereby causing the walls to be forced laterally into firm gripping engagement with the walls of the groove.

Further details of the invention will appear from the following description.

In the particular embodiment of the invention illustrated in Figs. 1 to 8 inclusive, the fin is formed from a strip of material which is bent into substantially U-shape to form fin walls 20 and 21 which are connected by a closed edge 22.

The part to be cooled may be of any desired form or shape and consists of a member 23 having a groove 24 adapted to receive the closed edge of the double walled fin in the manner shown in Fig. 6.

In the particular form of the invention shown in Figs. 1 to 3 inclusive, the member 23 to be cooled consists of a cylinder or tube having an annular groove 24 therein adapted to receive the closed edge of the fin. The fin is cut to the proper length to encircle the cylinder or tube 23 and to fit within the groove 24. After being cut to this length the fin section is bent to a circular shape conforming to the circumference of the base of the groove 24. The end portions 30 and 31 are then spread apart, as shown in Fig. 1, to open up the fin to a sufficient extent to permit the fin to be placed around the tubular member 23 by inserting the fin over the end of the tube and moving it longitudinally on the tube to the desired groove 24.

After the ˜1 has been inserted around the groove in the manner above described, mechanism such as that illustrated in Figs. 2 and 4 may be utilized to compress the fin and secure the fin in a groove. This mechanism consist of a pair of rollers 32 and 33 having longitudinal grooves 34 therein, these rollers engaging one edge of a strip or bar 35 which is provided at its opposite edge with inwardly extending slots 36 and 37 which are dimensioned to receive the walls 20 and 21 of the fin. The central web 38 formed by the slots 36 and 37 is slightly longer, as shown in Figs. 2 and 3, than the two outer webs. This central web 38 engages a compressible wire W which is fed between the walls 20 and 21 of the fin, as illustrated in Fig. 7. This material, disposed between the walls of the fin, is compressed, as shown in Figs. 4 and 8, thereby forcing the walls laterally into firm gripping engagement with the walls of the groove 24 and also forcing the closed edge 22 of the fin into the base of the groove.

As the cylinder is rotated in the direction of the arrow shown in Fig. 2, the fin is forced into the groove and is secured therein, and the insert W spans the gap between the split ends of the fin to a point such as that designated X in Figs. 2 and 3.

After the material, such as the wire W, between the walls of the fin has been compressed, the fin walls will be very securely and tightly anchored in the groove and will form an efficient heat conducting contact therewith.

In the form of the invention illustrated in Figs. 9 and 10, the fin sections 40 and 41 are formed into arcs measuring one half of the circumference of the groove. The fin in this instance is preferably formed in the manner shown in Fig. 13 or with a W section comprising walls 42 and 43 and an intermediate inwardly folded inverted V portion 44 which is disposed between the walls 42 and 43.

After the fins have been bent into the semi-circumferential arcuate form shown in Fig. 9, they are positioned around the cylinder or tube to which they are to be secured in the manner shown in said figure, and are then forced inwardly toward the axis of the tube and into the groove formed therein. After being so positioned the material 44 between the walls 42 and 43 is compressed in any desired manner as, for instance, by the mechanism shown in Figs. 2 and 4. As this material is compressed it is forced to the positioned shown in Fig. 14, thereby forcing the walls 42 and 43 laterally into firm and tight gripping engagement with the walls of the groove.

Fig. 10 illustrates the half sections secured around the part to be cooled and also illustrates baffles 45 and 46 for deflecting the air as it passes around the cylinder or tube, thus insuring the proper cooling of the wall of the part to be cooled remote from the entering position of the air. As shown in Fig. 10, the air enters at the front and leaves at the rear of the part to be cooled.

In the form of the invention illustrated in Figs. 11 and 12, notches 50, 51 and 52 are formed at the inner edge of the fin to facilitate the opening up or spreading of the ends of the fin to permit the fin to be placed over the part to be cooled and to be moved to the desired position thereon. Fig. 12 shows the fin illustrated in Fig. 11 as secured in position, this being accomplished in the manner above described in connection with the preceding figures.

From the foregoing specification it will be evident that the method of securing fins to parts to be cooled has been simplified and facilitated and that fins secured in the manner described will be firmly and tightly secured in position and will effectively conduct the heat from the tube, cylinder, or other part on which the fins are secured.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. The method of forming and securing cooling fins to a cylinder having a circumferential groove which consists of forming a fin strip into a double wall at one edge thereof by a bridge of compressible material integral with the walls extending outwardly from the inner edges of the walls and substantially filling the space therebetween at the connected edge portions to be inserted in the grooves, forming a radial slit in the connected edge of the double walled fin intermediate the ends thereof, pre-bending the fin longitudinally into a circumference corresponding to the circumference of the groove base, with the double edge at the inside, before the insertion of the fin in the groove, spreading apart the ends of a length of fin corresponding to the length of the base of the groove to permit the placing of the fin over the end of the cylinder, inserting the fin over the cylinder and in registration with the groove, and forcing the fin into the groove and the double walls laterally into firm gripping engagement with the walls of the groove.

2. The method of forming and securing fins to a peripherally grooved, cylindrical member which consists of forming a fin strip into W section, pre-bending said fin sections longitudinally into arcs conforming in curvature to the base of the groove before securing the fin sections in the groove, inserting pre-bent fin sections corresponding in length to not more than one half of the length of the circumference of the base of the groove around the cylindrical member and in said groove, and securing said sections in the groove by pressure against the material between the fin walls, thereby forcing the walls laterally into firm gripping engagement with the walls of the groove.

3. The method of providing a member with radiating fins which consists of forming a plurality of grooves in a member, forming double walled fin units with substantially parallel, spaced walls connected at one edge of each wall by a bridge of compressible material integral with the walls extending outwardly from the inner edges of the walls and substantially filling the space therebetween at the connected edge portions to be inserted in the grooves, pre-bending the fin longitudinally to conform to the contour of the groove before the insertion of the fin in the groove, inserting the connected edge of a pre-bent fin unit of predetermined length in each groove, and forcing said walls laterally by pressure against the outer portion of said compressible material directed toward the base of the groove to compact the compressible material and to anchor the walls in the grooves.

4. The method of providing a member with radiating fins which consists of forming a plurality of grooves in the member, forming double walled fin units with substantially parallel, spaced walls connected at one edge of each wall by a bridge of compressible material integral with the walls extending outwardly from the inner edges of the walls and substantially filling the space therebetween at the connected edge portions to be inserted in the grooves, pre-bending the fin longitudinally to arcuate form to conform to the curvature of the base of the groove before the insertion of the fin in the groove, inserting the connected edge of a fin unit of a length corresponding to one half of the circumference of the base of the groove in each groove, and forcing said walls laterally by pressure against the outer portion of said compressible material directed toward the base of the groove to compact the compressible material and to anchor the walls in the grooves.

WILHELM B. BRONANDER.